US009183541B2

(12) United States Patent
Iwai et al.

(10) Patent No.: US 9,183,541 B2
(45) Date of Patent: Nov. 10, 2015

(54) CONTENT DISPLAY SUPPORT SYSTEM

(75) Inventors: Hidetaka Iwai, Itami (JP); Kazumi Sawayanagi, Itami (TW); Toshihiko Otake, Ikeda (JP); Toshikazu Kawaguchi, Kobe (JP); Masayuki Kawamoto, Amagasaki (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 435 days.

(21) Appl. No.: 13/595,692

(22) Filed: Aug. 27, 2012

(65) Prior Publication Data
US 2013/0057684 A1  Mar. 7, 2013

(30) Foreign Application Priority Data
Sep. 2, 2011  (JP) ................. 2011-191723

(51) Int. Cl.
*H04W 4/02* (2009.01)
*G06Q 10/10* (2012.01)
*H04N 5/232* (2006.01)
*H04N 1/00* (2006.01)
*H04N 7/15* (2006.01)

(52) U.S. Cl.
CPC ........... *G06Q 10/10* (2013.01); *H04N 5/23206* (2013.01); *H04N 7/15* (2013.01); *H04N 1/00244* (2013.01); *H04W 4/026* (2013.01)

(58) Field of Classification Search
CPC .. H04N 5/23206; H04N 7/15; H04N 1/00244
USPC ........... 348/207.2, 207.99, 143, 14.02, 14.05, 348/211.2, 211.3, 207.1, 211.12, 211.13, 348/333.01
See application file for complete search history.

(56) References Cited

U.S. PATENT DOCUMENTS 7,149,549 B1 * 12/2006 Ortiz et al. .................... 455/566
7,265,779 B2 *  9/2007 Sato et al. .................. 348/207.1

(Continued)

FOREIGN PATENT DOCUMENTS

JP  2008-158992 A  7/2008
JP  2009-070207 A  4/2009

(Continued)

OTHER PUBLICATIONS

Office Action (Notice of Grounds of Rejection) issued by the Japanese Patent Office on Nov. 12, 2013 in corresponding Japanese Patent Application No. 2011-191723 and an English translation of the Official Action. (7 pages).

*Primary Examiner* — Ahmed A Berhan
(74) *Attorney, Agent, or Firm* — Buchanan Ingersoll & Rooney PC

(57) ABSTRACT

When an image of content reproduced by a first reproduction device is shot, a content display support device obtains the shot image and positional information that specifies the position and orientation of a shooting device. The content display support device generates combination content by visualizing and embedding the positional information in the shot image and transmits the combination content to a second reproduction device. A portable terminal obtains the positional information from an image obtained by shooting the combination content reproduced by the second reproduction device. The portable terminal requests supplementary information by transmitting the positional information to the content display support device. The supplementary information associated with the positional information is transmitted from the content display support device to the portable terminal and displayed at the portable terminal.

10 Claims, 15 Drawing Sheets

(56) References Cited

U.S. PATENT DOCUMENTS 8,634,848 B1 * 1/2014 Bozarth et al. ............. 455/456.1
2001/0024236 A1 * 9/2001 Sato et al. ..................... 348/239

FOREIGN PATENT DOCUMENTS

| JP | 2010-218343 A | 9/2010 |
| JP | 2010-273256 A | 12/2010 |

* cited by examiner

CONTENT DISPLAY SUPPORT SYSTEM

This application is based on Japanese Patent Application No. 2011-191723 filed with the Japan Patent Office on Sep. 2, 2011, the entire content of which is hereby incorporated by reference.

BACKGROUND OF THE INVENTION

1. Field of the Invention

The present invention relates to a content display support system, and more particularly to a content display support system for supporting content display at remote sites.

2. Description of the Related Art

Systems for sharing a material among a plurality of meeting participants have been proposed as meeting support systems.

For example, Japanese Laid-Open Patent Publication No. 2008-158992 discloses a system that allows a shared server to store document data as a material for use in an event such as a meeting, thereby making the document data open to the public, and provides the document data to an information terminal through a prescribed authentication process.

Japanese Laid-Open Patent Publication No. 2010-273256 discloses an image forming apparatus that supports a teleconference, in which an image of a videoconference at a remote site is analyzed so that a person image having a registered character is extracted from the image using a predefined selection condition, and a document is transmitted to a specified destination corresponding to the person image.

However, in either system, it is difficult for participants to obtain a shared material, for example, in a seminar or any other meeting that is open to public participants who are not registered beforehand.

SUMMARY OF THE INVENTION

The present invention is made in view of such a problem. An object of the present invention is to provide a content display support system capable of supporting display of content at a remote site with a simple operation.

In order to solve the problem above, according to an aspect of the present invention, a content display support system includes a portable terminal having a display capable of displaying content and supplementary information, a content display support device for supporting content display at the portable terminal, and a shooting device. The shooting device includes a transmission unit for transmitting a shot image obtained by shooting content reproduced by a first reproduction device and positional information that specifies a position and orientation of the shooting device, to the content display support device. The content display support device includes an obtaining unit for obtaining the shot image and the positional information from the shooting device, a generation unit for generating combination content by visualizing and embedding the positional information in the shot image, a control unit for transmitting the combination content to a second reproduction device for reproduction, and a transmission unit for transmitting the supplementary information associated with the positional information to the portable terminal in response to a request from the portable terminal. The portable terminal includes a processing unit for obtaining the positional information from an image obtained by shooting the combination content reproduced by the second reproduction device, a request unit for requesting the supplementary information to be displayed on the display from the content display support device by transmitting the positional information obtained by the processing unit to the content display support device, and a display processing unit for displaying the supplementary information received from the content display support device on the display.

Preferably, the generation unit of the content display support device converts the positional information into code information and embeds the code information in the shot image.

Preferably, the transmission unit of the content display support device transmits the supplementary information to the portable terminal if the positional information transmitted from the portable terminal falls within a predefined target range of transmission of the supplementary information.

Preferably, the portable terminal converts a display size of the supplementary information according to a size of an image representing the visualized positional information in an image obtained by shooting the combination content reproduced by the second reproduction device.

Preferably, the display processing unit of the portable terminal combines an image based on the supplementary information with an image obtained by shooting the combination content reproduced by the second reproduction device, and displays the combined image on the display.

According to another aspect of the present invention, a content display support system includes a portable terminal having a display capable of displaying content and supplementary information, a first reproduction device and a second reproduction device for displaying the content, a content display support device for supporting content display at the portable terminal, and a shooting device. The shooting device includes a transmission unit for transmitting a shot image obtained by shooting content reproduced by the first reproduction device and positional information that specifies a position and orientation of the shooting device, to the content display support device. The content display support device includes an obtaining unit for obtaining the shot image and the positional information from the shooting device, a control unit for transmitting the positional information and transmitting the content reproduced by the first reproduction device to the second reproduction device for reproduction, and a transmission unit for transmitting the supplementary information associated with the positional information to the portable terminal in response to a request from the portable terminal. The second reproduction device includes a reception unit for receiving the positional information from the content display support device, and a transmission unit for transmitting the positional information received by the reception unit to the portable terminal. The portable terminal includes an obtaining unit for obtaining the positional information transmitted from the second reproduction device, a request unit for requesting the supplementary information to be displayed on the display from the content display support device by transmitting the positional information obtained by the obtaining unit to the content display support device, and a display processing unit for displaying the supplementary information received from the content display support device on the display.

According to a further aspect of the present invention, a content display support device for supporting content display at a portable terminal includes an obtaining unit for obtaining, from a shooting device, a shot image obtained by shooting content reproduced by a first reproduction device and positional information that specifies a position and orientation of the shooting device, a generation unit for generating combination content by visualizing and embedding the positional information in the shot image, a control unit for transmitting the combination content to a second reproduction device for reproduction, and a transmission unit for accepting, from the portable terminal, a request for supplementary information together with the positional information obtained from an image obtained by shooting the combination content reproduced by the second reproduction device, thereby transmitting the supplementary information associated with the positional information to the portable terminal.

According to a still further aspect of the present invention, a method of supporting display of content at a portable terminal includes the steps of: shooting, by a shooting device, content reproduced by a first reproduction device; obtaining, by a content display support device, a shot image by the shooting device and positional information that specifies a position and orientation of the shooting device; generating, by the content display support device, combination content by visualizing and embedding the positional information in the shot image, and transmitting the generated combination content to a second reproduction device; reproducing, by the second reproduction device, the combination content; obtaining, by the portable terminal, the positional information from an image obtained by shooting the combination content reproduced by the second reproduction device; requesting, by the portable terminal, supplementary information to be displayed from the content display support device by transmitting the positional information to the content display support device; transmitting the supplementary information associated with the positional information from the content display support device to the portable terminal in response to a request from the portable terminal; and displaying the supplementary information received from the content display support device, at the portable terminal.

According to yet another aspect of present invention, a non-transitory computer-readable storage medium is encoded with a program for causing a content display support device having a controller to execute a process of supporting display of content at a portable terminal. The program instructs the controller to perform the steps of: obtaining, from a shooting device, a shot image obtained by shooting content reproduced by a first reproduction device and positional information that specifies a position and orientation of the shooting device; generating combination content by visualizing and embedding the positional information in the shot image; transmitting the combination content to a second reproduction device for reproduction; and accepting, from the portable terminal, a request for supplementary information together with the positional information obtained from an image obtained by shooting the combination content reproduced by the second reproduction device, thereby transmitting the supplementary information associated with the positional information to the portable terminal.

According to a further aspect of the present invention, a non-transitory computer-readable storage medium is encoded with a program for causing a portable terminal having a display and a controller to execute a content display process. The program instructs the controller to perform the steps of: obtaining positional information from a shot image obtained by shooting combination content having the positional information embedded therein that is reproduced by a reproduction device; requesting supplementary information from a content display support device by transmitting the positional information to the content display support device; and displaying, on the display, the supplementary information transmitted from the content display support device in response to the request.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
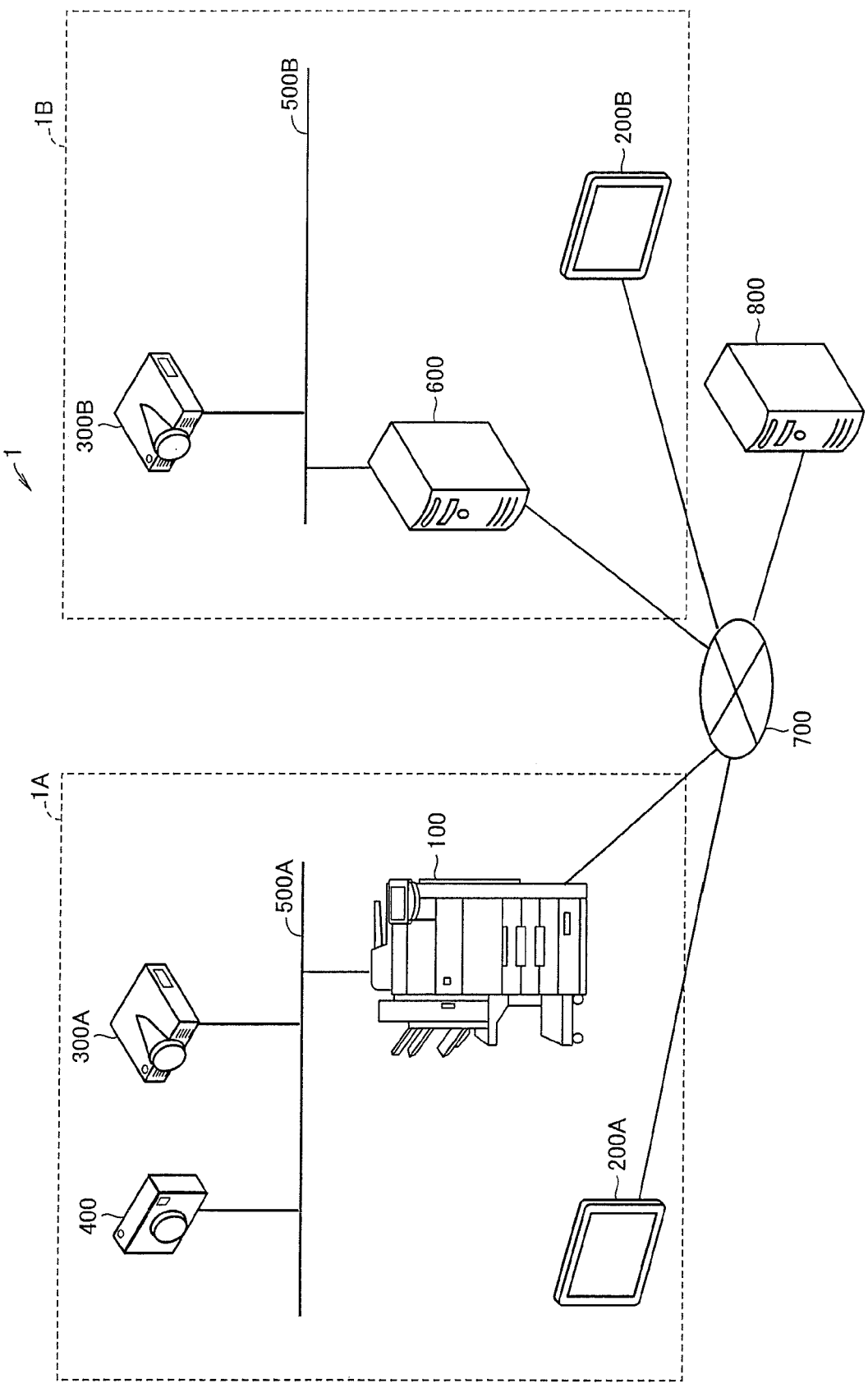
FIG. 1 is a diagram showing a specific example of a configuration of a meeting support system (hereinafter abbreviated as a system) according to an embodiment of a content display support system.

In the following, embodiments of the present invention will be described with reference to the figures. In the following description, the same parts and components are denoted with the same reference numerals. Their names and functions are also the same.

<System Configuration>

FIG. 1 is a diagram showing a specific example of a configuration of a meeting support system (hereinafter abbreviated as the system) 1 according to an embodiment of a content display support system.

Referring to FIG. 1, system 1 includes an MFP (Multi-Functional Peripheral) 100 as an image forming apparatus that functions as a videoconference system server, a plurality of portable terminals 200A and 200B, a plurality of projectors 300A and 300B that function as content reproduction devices, a camera 400, a server 600 that functions as a videoconference system server, and a server 800 that functions as a server for displaying a tagged screen described later. Portable terminals 200A and 200B are collectively referred to as portable terminal 200.

In this example, an MFP is taken as an example of the apparatus that functions as a videoconference system server. However, it may be any other image forming apparatus having a communication function or may be a server similar to server 600.

In this example, MFP 100 and server 600 separately function as devices that support reproduction of content at projector 300 that is a content reproduction device. However, they may be configured in a single device.

Furthermore, MFP 100 and server 800 separately function as devices that support display of the tagged content at portable terminal 200 that is a device for displaying the tagged content. However, they may be configured in a single device.

MFP 100, server 600, and server 800 may be configured in a single device as a content display support system for supporting reproduction of content at the content reproduction device and display of content with supplementary information at the portable terminal.

In the system, MFP 100, projector 300A, and camera 400 are configured to be able to communicate via a network 500A. Projector 300B and server 600 are configured to be able to communicate via a network 500B. MFP 100, projectors 300A, 300B, and servers 600, 800 are configured to be able to communicate via the Internet 700.

System 1 supports a presentation made with materials projected by projector 300A and, in addition, duplicates the presentation using projector 300A at a remote site using projector 300B and supports the presentation. In the present embodiment, MFP 100 functions as a videoconference system server to configure a content display support device.

More specifically, system 1 is assumed to be used in such a manner that it is divided into a system 1A provided in a first site installed with network 500A and a system 1B provided in a second site installed with network 500B. As shown in the figure, MFP 100, projector 300A, and camera 400 connected to network 500A are provided as system 1A in the first site. Portable terminal 200A is additionally provided in the first site. The first site can be said as a site where a presentation is held with materials being projected by projector 300A.

On the other hand, projector 300B and server 600 connected to network 500B are provided as system 1B in the second site. Portable terminal 200B is additionally provided in the second site. The second site can be said as a site where the presentation using projector 300A is duplicated using projector 300B.

The internet 700 and server 800 have a function of connecting system 1A and system 1B, and support information about a presentation at the first site and duplication of the presentation at the second site.

<Device Configuration>
<Device Configuration of MFP>

Figure 2:
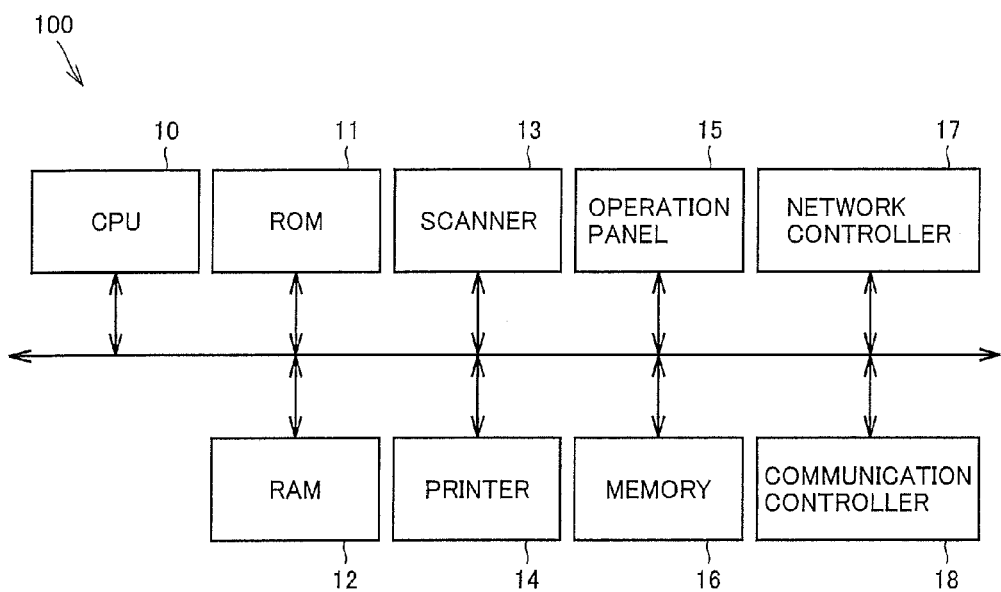
FIG. 2 is a diagram showing a specific example of a hardware configuration of an MFP (Multi-Functional Peripheral) included in the system.

FIG. 2 is a diagram showing a specific example of a hardware configuration of MFP 100.

Referring to FIG. 2, MFP 100 includes a CPU (Central Processing Unit) 10 as an arithmetic unit for controlling MFP 100 as a whole, a ROM (Read Only Memory) 11 for storing a program executed in CPU 10, a RAM (Random Access Memory) 12 functioning as a work area for executing a program in CPU 10, a scanner 13 for optically scanning a document placed on a not-shown platen to obtain image data, a printer 14 for fixing image data on print paper, an operation panel 15 for displaying information and accepting an operation input to MFP 100, a memory 16 for storing image data, a communication controller 17 for controlling communication via network 500A, and a communication controller 18 for controlling communication via the Internet 700.

<Device Configuration of Portable Terminal>

Figure 3:
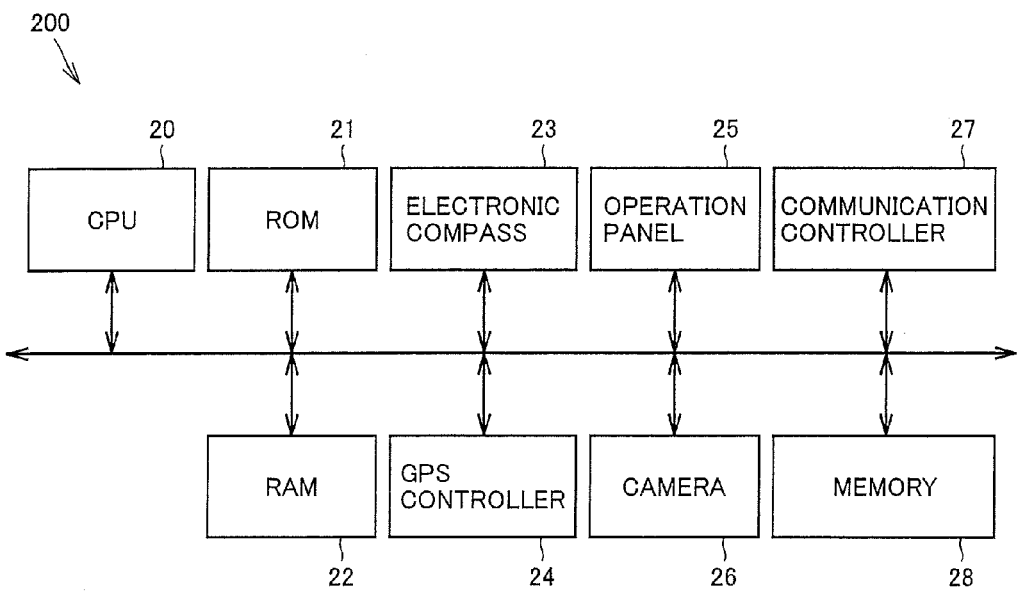
FIG. 3 is a diagram showing a specific example of a hardware configuration of a portable terminal included in the system.

FIG. 3 is a diagram showing a specific example of a hardware configuration of portable terminal 200.

Referring to FIG. 3, portable terminal 200 includes a CPU 20 as an arithmetic unit for controlling portable terminal 200 as a whole, a ROM 21 for storing a program executed in CPU 20, a RAM 22 functioning as a work area for executing a program in CPU 20, an electronic compass 23 including a magnetic sensor for detecting an orientation of potable terminal 200, a GPS (Global Positioning System) controller 24 receiving a GPS signal or a positional signal from a base station for obtaining positional information of portable terminal 200, an operation panel 25 including a touch panel for displaying information and accepting an operation input to portable terminal 200, a camera 26, a controller 27 for controlling communication via the Internet 700, and a memory 28 for storing image data and the like.

Operation panel 25 includes, for example, a touch panel included a display such as a liquid crystal display and a position designating device such as an optical touch panel or a capacitive touch panel, and operation keys.

CPU 20 allows the touch panel to display an operation screen based on data for allowing screen display that is stored beforehand. A designated position on the operation screen is specified on the touch panel, and an operation signal indicating the designated position is input to CPU 20. An operation signal indicating the pressed key is also input to CPU 20. CPU 20 specifies an operation content based on the pressed key, or the displayed operation screen and the designated position, and executes a process based on the operation content.

Electronic compass 23 and GPS controller 24 output a signal to CPU 20 to indicate the obtained orientation or positional information of potable terminal 200.

<Device Configuration of Server>

Figure 4:
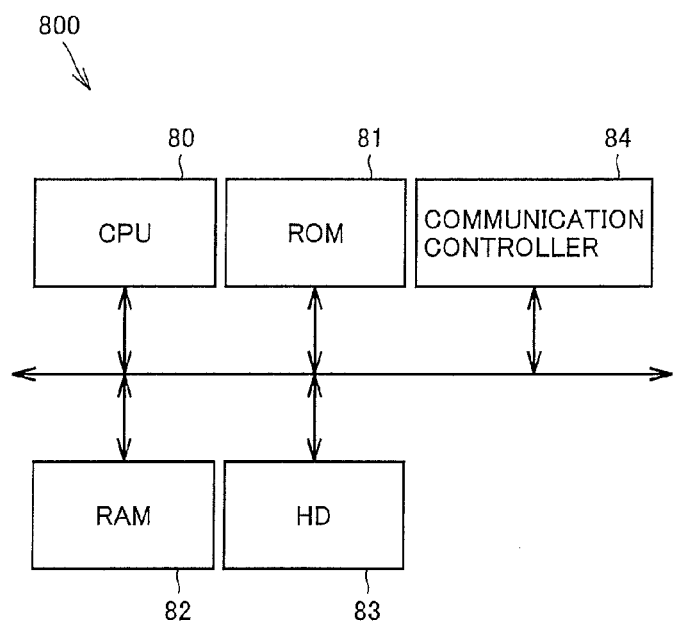
FIG. 4 is a diagram showing a specific example of a hardware configuration of a server included in the system.

FIG. 4 is a diagram showing a specific example of a hardware configuration of server 800.

Referring to FIG. 4, server 800 is formed, for example, of a general computer. By way of example, server 800 includes a CPU 80 as an arithmetic unit for controlling server 800 as a whole, a ROM 81 for storing a program executed in CPU 80, a RAM 82 functioning as a work area for executing a program in CPU 80, an HD (Hard Disk) 83 for storing various information, a communication controller 84 for controlling communication via the Internet 700, and a network controller 85 for controlling communication via network 500B.

Server 600 is also configured with a general computer and has the same configuration as the hardware configuration of server 800 shown in FIG. 4.

<Device Configuration of Camera>

Figure 5:
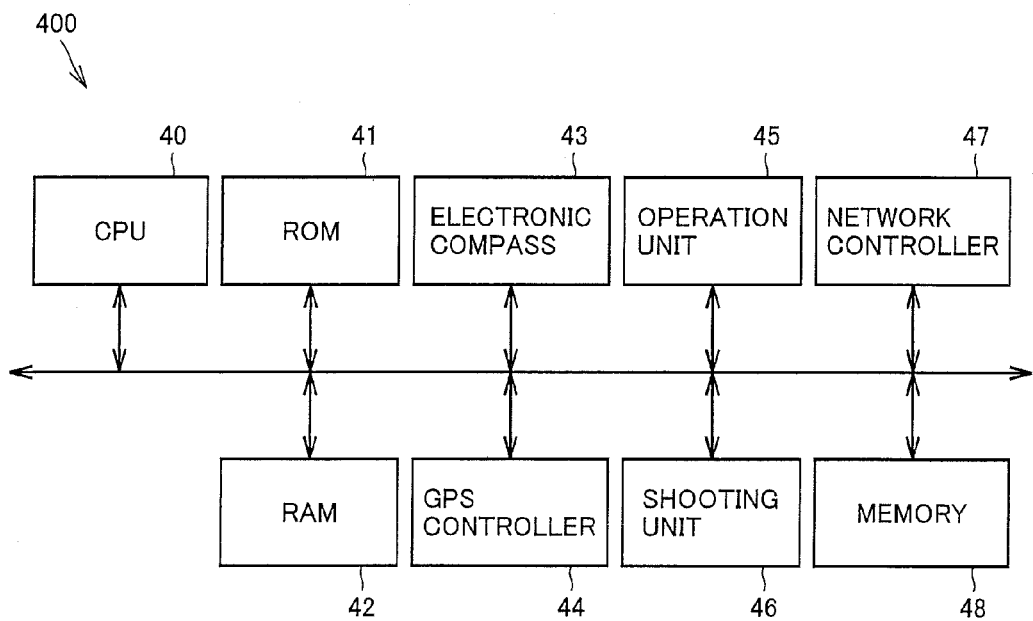
FIG. 5 is a diagram showing a specific example of a hardware configuration of a camera included in the system.

FIG. 5 is diagram showing a specific example of a hardware configuration of camera 400.

Referring to FIG. 5, camera 400 includes a CPU 40 as an arithmetic unit for controlling camera 400 as a whole, a ROM 41 for storing a program executed in CPU 40, a RAM 42 functioning as a work area for executing a program in CPU 40, an electronic compass 43 including a magnetic sensor for detecting an orientation of camera 400, a GPS controller 44 receiving a GPS signal or a positional signal from a base station for obtaining positional information of camera 400, an operation panel 45 for accepting an operation input to camera 400, a shooting unit 46, a network controller 47 for controlling communication via network 500A, and a memory 48 for storing image data and the like.

<Operation Overview>

Figure 6:
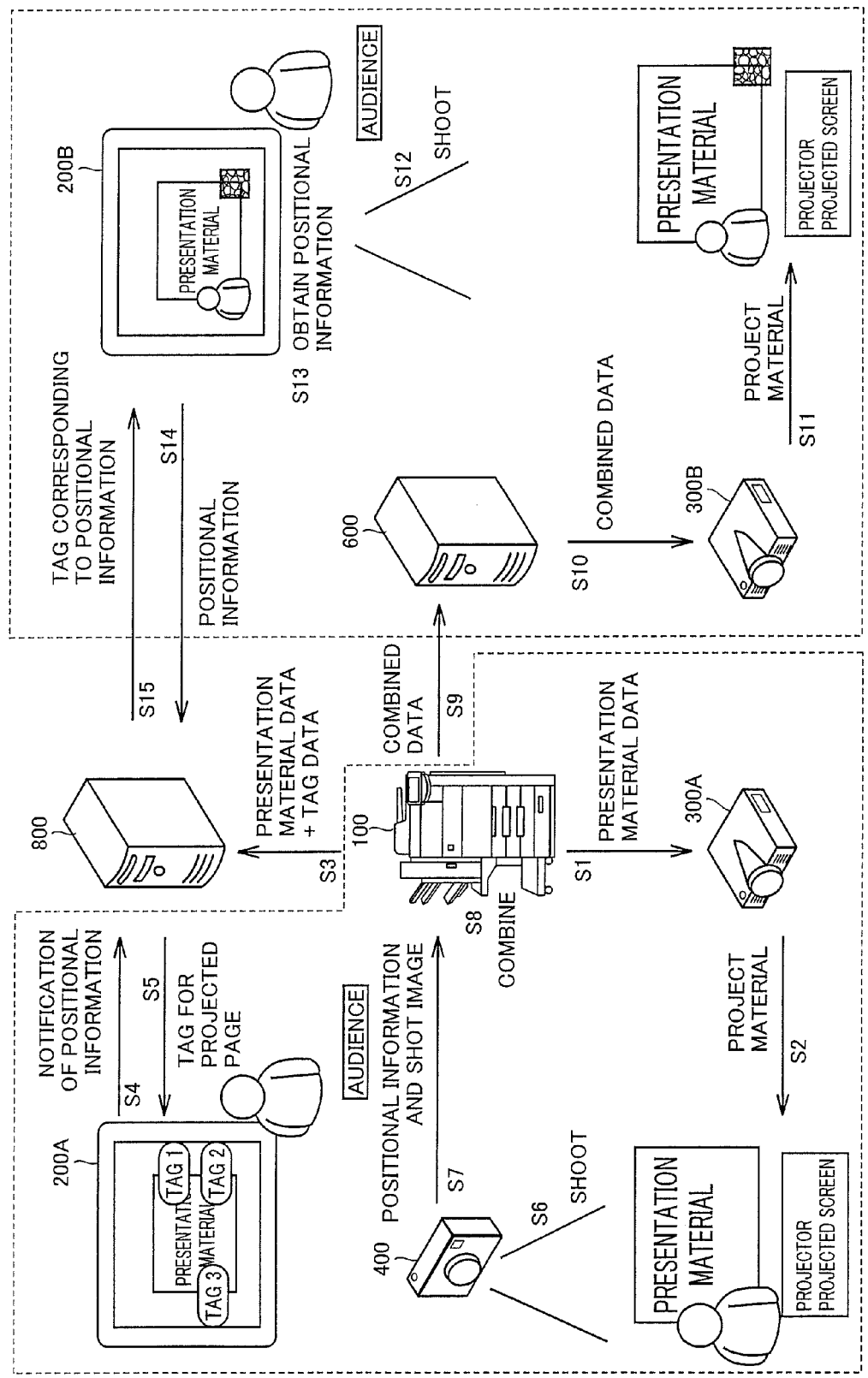
FIG. 6 is a diagram illustrating an operation overview in the system.

FIG. 6 is a diagram illustrating an operation overview in system 1.

Referring to FIG. 6, data of a material necessary for a presentation (presentation material data) is stored in MFP 100, and the data is passed from MFP 100 to projector 300A (S1). Then, the data is projected by projector 300A (S2). The presenter can make a presentation using the projected presentation material.

MFP 100 transmits the presentation material passed to projector 300A and tag data that is information to be combined with the presentation material, to server 800 (S3). The tag data is data associated with the presentation material in advance so that an image representing supplementary information called a "tag" is combined with the presentation material. Specifically, the tag data includes image data to be combined with the presentation material and information that specifies a position in the presentation material combined with the image. When the presentation material is information composed of images of plural pages or moving images, the presentation material additionally includes information that specifies an image to be combined with a tag in the presentation material (for example, a page number, an elapsed time since the start of reproduction).

Portable terminal 200A is carried by the audience at the presentation. When an application for displaying a tagged screen is activated in portable terminal 200A, portable terminal 200A requests distribution of display data by transmitting positional information that specifies the position and orientation of portable terminal 200A to server 800 (S4).

A range of positions suitable for distributing a tag is stored in server 800. This range of positions includes the direction in which the portable terminal is oriented, in addition to the position where the portable terminal is present. The range of suitable positions in this example includes, for example, the direction that is present in the first site and faces the projection position of projector 300A.

When receiving the request from portable terminal 200A, server 800 determines that portable terminal 200A is a target to which a tag is transmitted, if the received positional information falls within the range.

Server 800 generates a tagged screen in which the presentation material received from MFP 100 is combined with the tag data, and transmits data for displaying the generated screen to portable terminal 200A determined as a target to which content is transmitted (S5). This combination may be performed by MFP 100, and the data for displaying the screen may be transmitted to server 800.

Accordingly, in system 1A in the first site of system 1, the presentation material is projected by projector 300A, and the tagged screen including a tag combined with the presentation material is displayed at portable terminal 200A in the first site.

Next, as an operation for duplicating the presentation made in the first site, at the second site, the material projected by projector 300A is shot by camera 400 in the first site (S6). Camera 400 transmits, to MFP 100, the position and direction at the time of shooting as positional information together with the shot image obtained by shooting (S7).

In this example, camera 400 includes a function for specifying the position and direction as described later to transmit information that specifies the position and direction together with the shot image to MFP 100. However, the acquisition of information of camera 400 by MFP 100 is not limited to the acquisition from camera 400. For example, the installation position of camera 400 may be input in advance using operation panel 15 or the like, or the input may be accepted from any other device such as portable terminal 200A. Camera 400 may be included in MFP 100, or a not-shown sensor for detecting the position of camera 400 may be included in MFP 100.

MFP 100 converts the positional information into an image and combines the image with the shot image (S8) and passes the combined data to server 600 (S9). The image is, for example, a QR code®. In the example below, the image is assumed as a QR code.

Server 600 passes the received combined data to projector 300B (S10). The combined data is projected by projector 300B (S11). Accordingly, projector 300B in the second site projects a screen in which the image obtained by shooting the image of the presentation material projected by projector 300A with camera 400 in the first site is combined with the image obtained by duplicating the positional information of camera 400.

Portable terminal 200B is carried by the audience at the presentation in the second site. When an application for displaying a tagged screen is activated, and the screen projected by projector 300B is shot at portable terminal 200B (S12), the QR code in the shot image is analyzed at portable terminal 200B, whereby the positional information of camera 400 is obtained (S13). Portable terminal 200B requests distribution of display data by transmitting the obtained positional information to server 800 (S14).

When receiving the request from portable terminal 200B, server 800 performs the same operation as the operation in step S5. More specifically, server 800 determines that portable terminal 200B is a target to which a tag is transmitted, based on the received positional information, generates a tagged screen in which the presentation material received from MFP 100 is combined with tag data, and transmits data for displaying the screen (S15).

Figure 7:
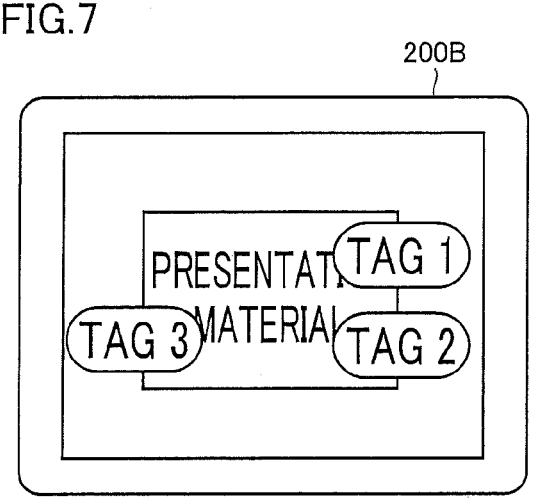
FIG. 7 is a diagram showing a specific example of a screen appearing on the portable terminal.

FIG. 7 is a diagram showing a specific example of the screen appearing on portable terminal 200B through the operation above. Specifically, as depicted in FIG. 7, through the operation above, a similar screen as the tagged screen displayed at portable terminal 200A used in the first site as illustrated in FIG. 6 is displayed at portable terminal 200B used in the second site at a location different from the first site. Therefore, the audience in the second site remote from the first site can also see the presentation material with tags in a similar manner as the audience in the first site.

<Functional Configuration>
<Functional Configuration of Portable Terminal>

Figure 8:
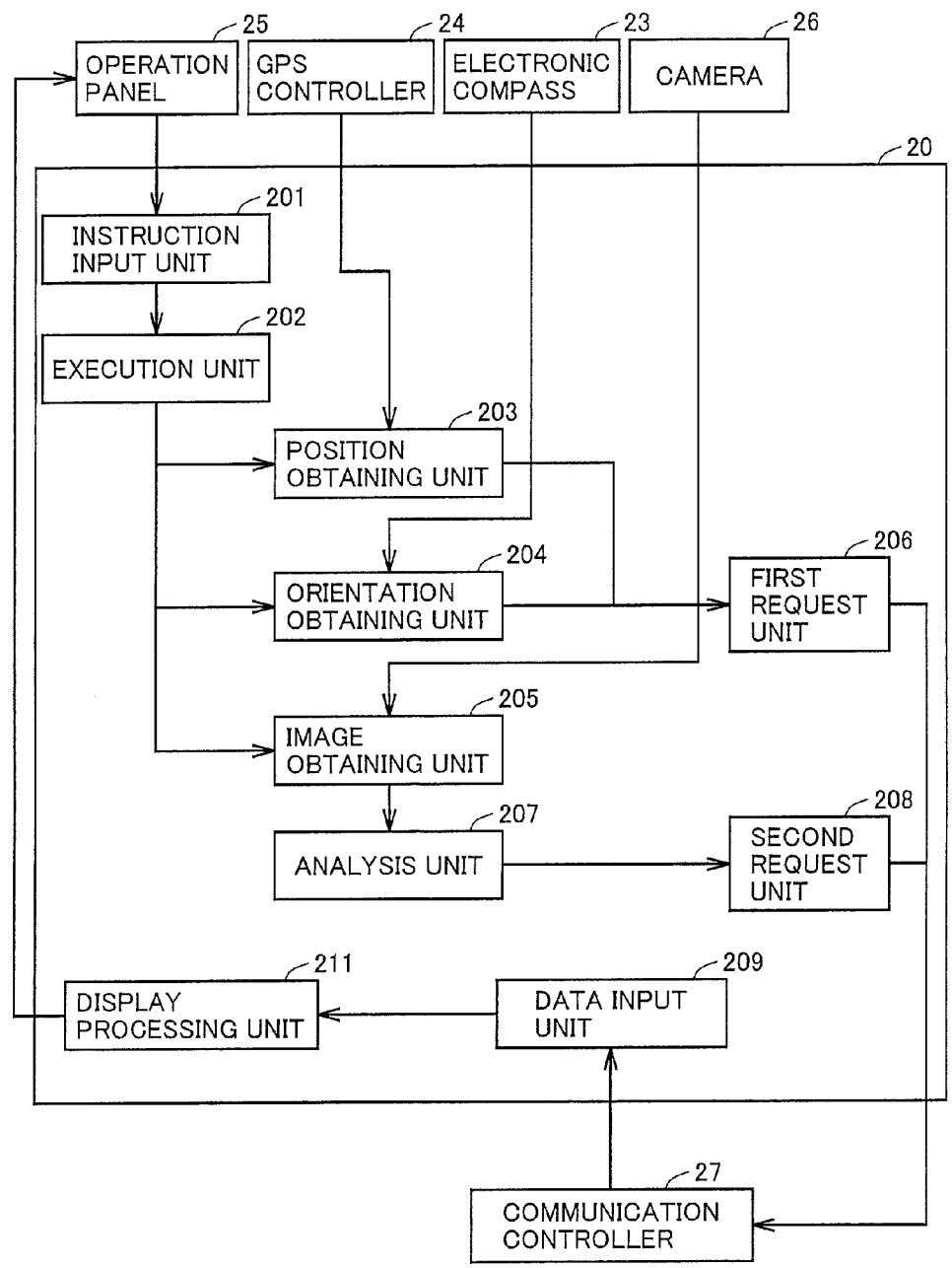
FIG. 8 is a block diagram showing a specific example of a functional configuration of the portable terminal.

FIG. 8 is a block diagram showing a specific example of a functional configuration of portable terminal 200. Each function shown in FIG. 8 is a function mainly included in CPU 20 when CPU 20 reads out a program stored in ROM 21 and executes the program on RAM 22. However, at least part of the functions may be formed by the hardware configuration shown in FIG. 3.

Referring to FIG. 8, as functions for implementing the operations as described above, portable terminal 200 includes an instruction input unit 201 for accepting an instruction input from operation panel 25, an execution unit 202 for executing an application in accordance with an instruction, a position obtaining unit 203 for obtaining the position of portable terminal 200 in accordance with execution of the application for displaying a tagged screen in execution unit 202, an orientation obtaining unit 204 for obtaining an orientation of portable terminal 200 in accordance with execution of the application for displaying a tagged screen in execution unit 202, an image obtaining unit 205 for obtaining a shot image by shooting by camera 26 in response to a shooting instruction from operation panel 25, a first request unit 206 for requesting data for displaying a tagged screen by transmitting the obtained position and orientation as positional information to server 800 in accordance with execution of the application for displaying a tagged screen in execution unit 202, an analysis unit 207 for analyzing the shot image by camera 26 to obtain the positional information from the QR code included in the shot image, a second request unit 208 for requesting data for displaying a tagged screen by transmitting the positional information to server 800, a data input unit 209 for accepting input of data from server 800, and a display processing unit 211 for executing a process of displaying a tagged screen on operation panel 25 based on the screen data from server 800.

<Functional Configuration of Server>

Figure 9:
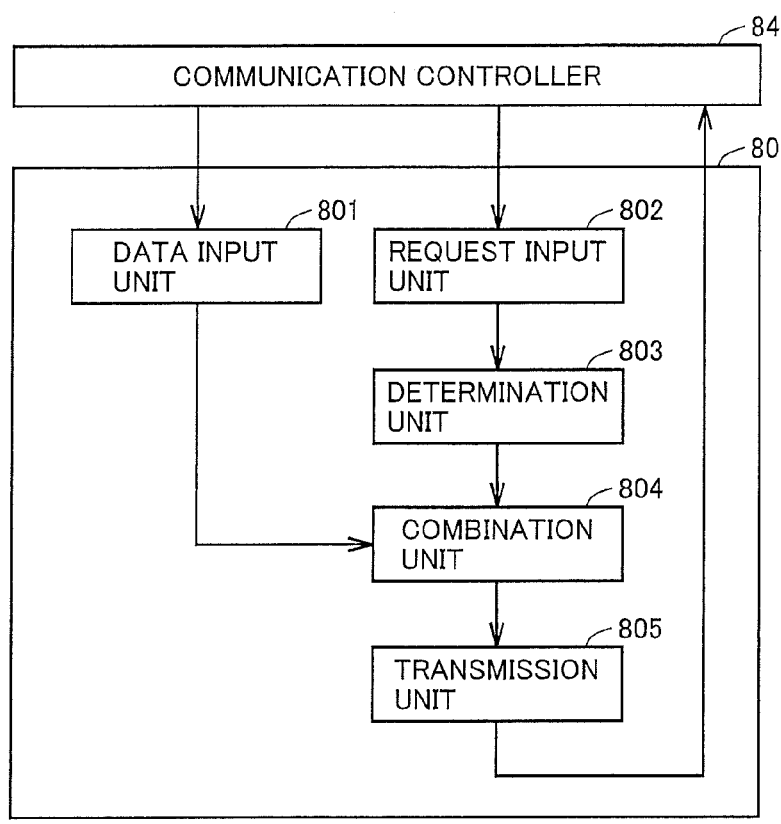
FIG. 9 is a block diagram showing a specific example of a functional configuration of the server.

FIG. 9 is a block diagram showing a specific example of a functional configuration of server 800. Each function shown in FIG. 9 is a function mainly formed in CPU 80 when CPU 80 reads out a program stored in ROM 81 and executes the program on RAM 82. However, at least part of the functions may be formed by the hardware configuration shown in FIG. 4.

Referring to FIG. 9, server 800 includes, as functions for implementing the operation above, a data input unit 801 for accepting input of presentation material data and tag data associated with the presentation material data from MFP 100, a request input unit 802 for accepting a request for data for displaying a screen together with positional information from portable terminal 200, a determination unit 803 for storing a range of positions suitable for distributing a tag associated with the presentation material in advance for determining whether to distribute a tag by determining whether the position and orientation specified by the positional information from portable terminal 200 falls within that range, a combination unit 804 for, if a tag is to be distributed, generating data for displaying a tagged screen by combining presentation material data with tag data associated with the presentation material data, and a transmission unit 805 for transmitting the data to portable terminal 200 that makes a request.

<Functional Configuration of MFP>

Figure 10:
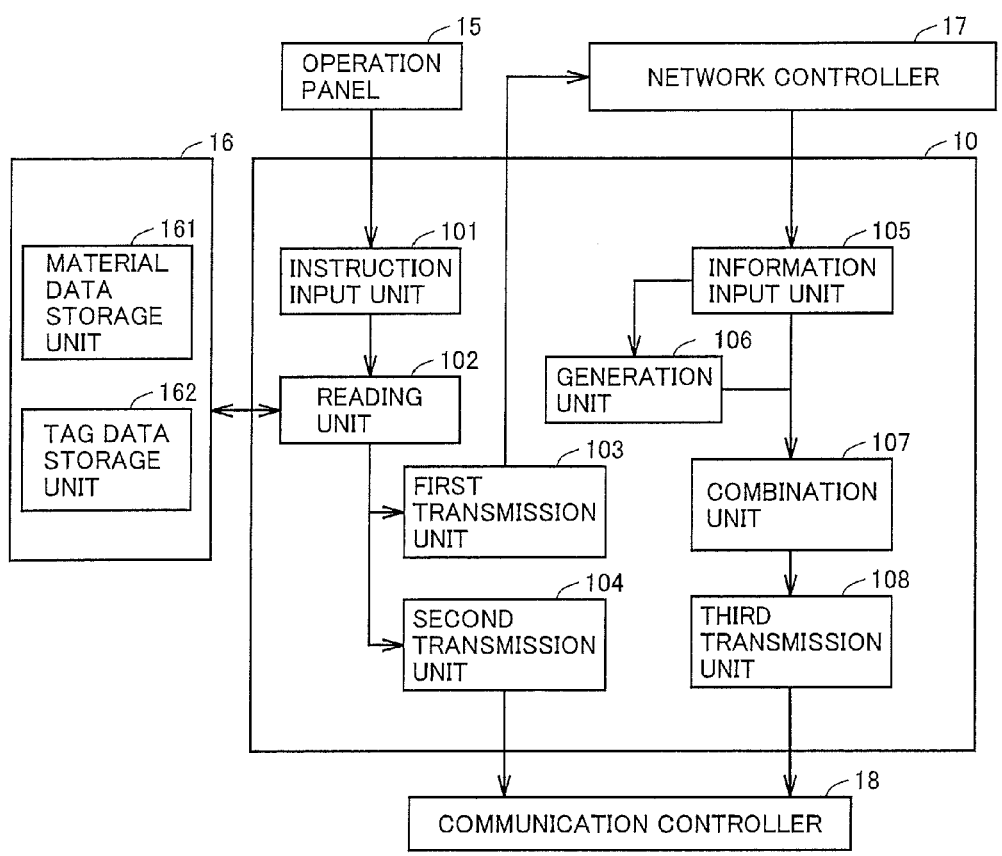
FIG. 10 is a block diagram showing a specific example of a functional configuration of the MFP.

FIG. 10 is a block diagram showing a specific example of a functional configuration of MFP 100. Each function shown in FIG. 10 is mainly formed in CPU 10 when CPU 10 reads out a program stored in ROM 11 and executes the program on RAM 12. However, at least part of the functions may be formed by the hardware configuration shown in FIG. 2.

As shown in FIG. 10, memory 16 of MFP 100 includes a material data storage unit 161 for storing presentation material data and a tag data storage unit 162 for storing tag data associated with a presentation material.

Further referring to FIG. 10, MFP 100 includes, as functions for implementing the operation above, an instruction input unit 101 for accepting an instruction input from operation panel 15, a reading unit 102 for reading out presentation material data and tag data associated with the presentation material data from memory 16 in accordance with an instruction to start projection of a presentation material from operation panel 15, a first transmission unit 103 for transmitting presentation material data to projector 300A, a second transmission unit 104 for transmitting presentation material data and tag data to server 800, an information input unit 105 for accepting input of positional information that specifies the position and direction of camera 400 and a shot image from camera 400, a generation unit 106 for generating a QR code as an image representing the positional information of camera 400, a combination unit 107 for combining the generated QR code with the shot image, and a third transmission unit 108 for transmitting the generated combined data to server 600. Here, the method of converting the positional information of camera 400 into a QR code in generation unit 106 is not limited to any particular method.

In the example above, when projection of a presentation material is started at projector 300A, an instruction to start is input from operation panel 15 of MFP 100. However, as another example, projector 300A may be operated so that an instruction signal to start may be transmitted from projector 300A to MFP 100.

<Operation Flow>

Figure 11:
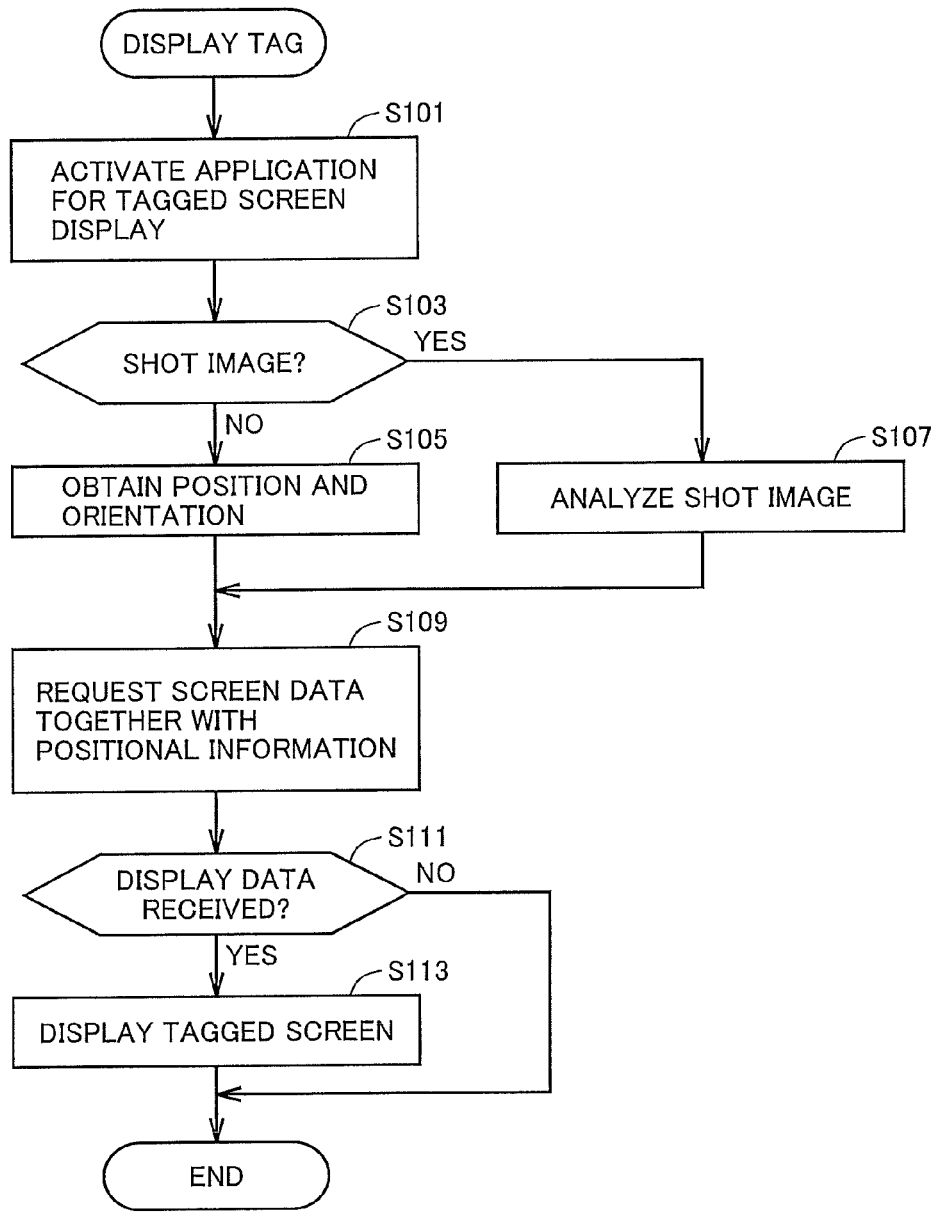
FIG. 11 is a flowchart illustrating a flow of an operation in the portable terminal for displaying a tagged screen.

FIG. 11 is a flowchart illustrating a flow of an operation in portable terminal 200 for displaying a tagged screen. The operation shown in the flowchart in FIG. 11 is implemented by CPU 20 reading out a program stored in ROM 21 and executing the program on RAM 22 to perform the functions shown in FIG. 8.

Referring to FIG. 11, in step S101, CPU 20 activates an application for displaying a tagged screen in accordance with an instruction input from operation panel 25. Then, in step S103, CPU 20 determines whether a shot image has been obtained by shooting an image with camera 26.

If an image is not shot with camera 26 (NO in step S103), in step S105, CPU 20 obtains the position and orientation of portable terminal 200 and, in step S109, transmits them as positional information to server 800 to request data for displaying a tagged screen from server 800.

This corresponds to the operation in the case where the application is activated at portable terminal 200A for displaying a tag together with a presentation material projected by projector 300A in the first site in the foregoing description.

On the other hand, if a shot image has been obtained by shooting an image with camera 26 (YES in step S103), in step S107, CPU 20 analyzes the shot image and obtains the positional information specified by the QR code from the QR code included in the shot image. Then, in step S109, a request for data for displaying a tagged screen is made to server 800 by transmitting the obtained positional information to server 800.

This corresponds to the operation in the case where the shot image by camera 400 in the first site that is projected by projector 300B is shot by portable terminal 200B whereby a tagged screen for the presentation material is requested. In this case, the shot image projected by projector 300B through the operation by MFP 100 described later includes the presentation material projected by projector 300A in the first site as well as the QR code representing the positional information of camera 400. Therefore, the shot image by portable terminal 200B also includes the QR code.

When data is received from server 800 in response to the request in step S109 above (YES in step S111), in step S113, CPU 20 displays a tagged screen on operation panel 25 using the received data.

Figure 12:
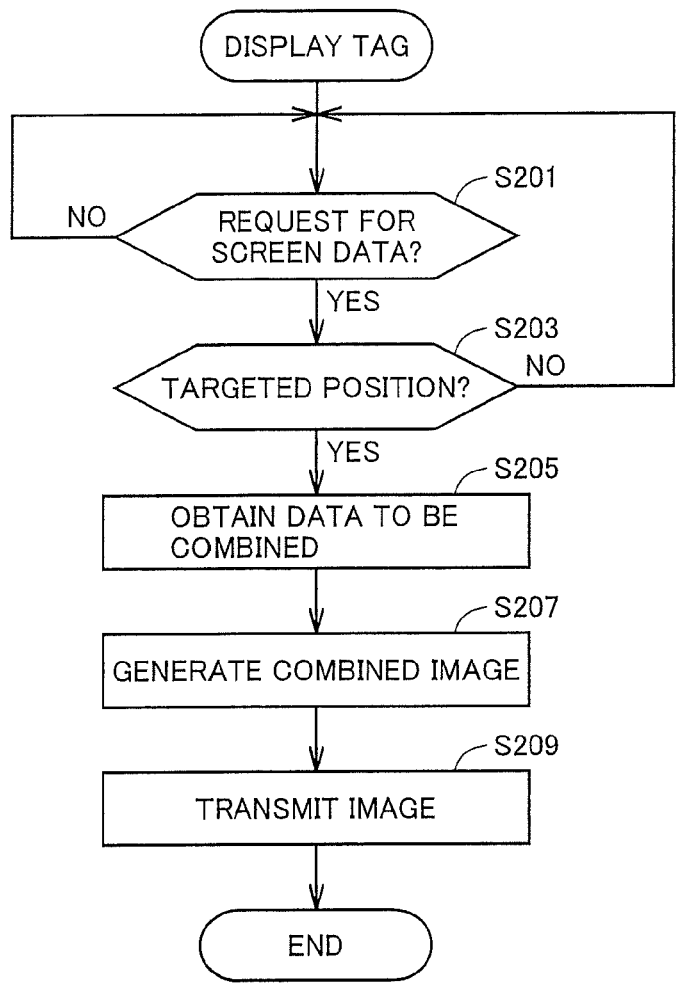
FIG. 12 is a flowchart showing a flow of an operation in the server for allowing the portable terminal to display a tagged screen.

FIG. 12 is a flowchart showing a flow of an operation in server 800 for allowing portable terminal 200 to display a tagged screen. The operation shown in the flowchart in FIG. 12 is implemented by CPU 80 reading out a program stored in ROM 81 and executing the program on RAM 82 to perform the functions shown in FIG. 9.

Referring to FIG. 12, in step S201, CPU 80 determines whether a request for data for displaying a tagged screen is accepted from portable terminal 200. The request includes the position and orientation of portable terminal 200 as positional information.

If it is determined that the request is accepted, from portable terminal 200 (YES in step S201), in step S203, CPU 80 determines whether the position and orientation of portable terminal 200 that is specified by the positional information included in the request falls within the target range of content distribution that is stored beforehand.

If the position and orientation specified by the positional information obtained from portable terminal 200 falls within the range above (YES in S203), in step S205, CPU 80 obtains data to be combined. The data to be combined includes presentation material data to be displayed at portable terminal 200 and tag data associated with the presentation material.

If the position and orientation of portable terminal 200 does not fall within the range above in step S103 above, CPU 80 determines that portable terminal 200 is not a target to which content is distributed, and returns the process to step S201.

In this example, the data to be combined is obtained from MFP 100 when the request is made and when it is determined that portable terminal 200 that makes a request is a target of distribution. Alternatively, the data to be combined may be requested from MFP 100 at the time when the determination is made.

However, the timing for obtaining the data to be combined is not limited to this timing. As another example, at a timing when presentation material data is passed from MFP 100 to projector 300A, the presentation material data and the associated tag data may be received, and these data to be combined may be stored. In this manner, the following operation can be performed at an earlier timing when the request is made.

In step S207, CPU 80 generates a combined image including presentation material data and tag data, and in step S209, transmits the generated combined image to portable terminal 200 that has made a request, and then terminates the process for displaying a tagged screen.

When the request is made by portable terminal 200A, as a result of this operation, a screen including a presentation material combined with a tag as shown in FIG. 6 is displayed at portable terminal 200A.

Figure 13:
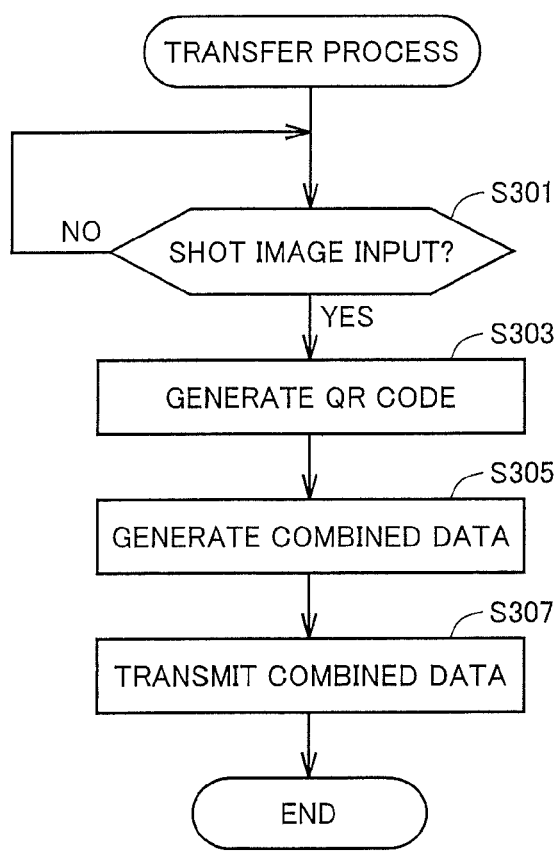
FIG. 13 is a flowchart showing a flow of an operation in the MFP for transferring a presentation material from a first site to a second side.

FIG. 13 is a flowchart showing a flow of an operation in MFP 100 for transferring a presentation material from the first site to the second site. The operation in the flowchart in FIG. 13 is implemented by CPU 10 reading out a program stored in ROM 11 and executing the program on RAM 12 to perform the functions shown in FIG. 10.

Referring to FIG. 13, in step S301, if it is determined that input of a shot image is accepted from camera 400 (YES in step S301), in step S303, CPU 10 generates a QR code as an image representing the position and orientation, from the positional information that specifies the position and orientation of camera 400 that is input together with the shot image. Then, in step S305, CPU 10 combines the generated QR code with the input shot image and, in step S307, transmits the combined data to server 600.

Accordingly, the combined data is transmitted from server 600 to projector 300B (step S10 above), and the presentation material projected in the first site that is shot in the shot image combined with the QR code is projected by projector 300B in the second site.

<Effects of Embodiment>

As a result of the operation performed in system 1 as described above, in the first site, a presentation material used in a presentation and a tag associated with the presentation material are combined and displayed with a simple operation at portable terminal 200A carried by the audience.

The presentation material used in the presentation made in the first site is projected at the second site remote from the first site. In addition, the same tagged screen as the tagged screen displayed at portable terminal 200A of the audience at the first site is also displayed with a simple operation at portable terminal 200B carried by the audience at the second side.

Accordingly, for example, in a case where a videoconference in the seminar style is held, public audiences at the connected site can obtain tag data associated with the projected material and obtain supplementary information with a simple operation without the need for a cumbersome procedure such as issuing an access account.

<First Modification>

Figure 14:
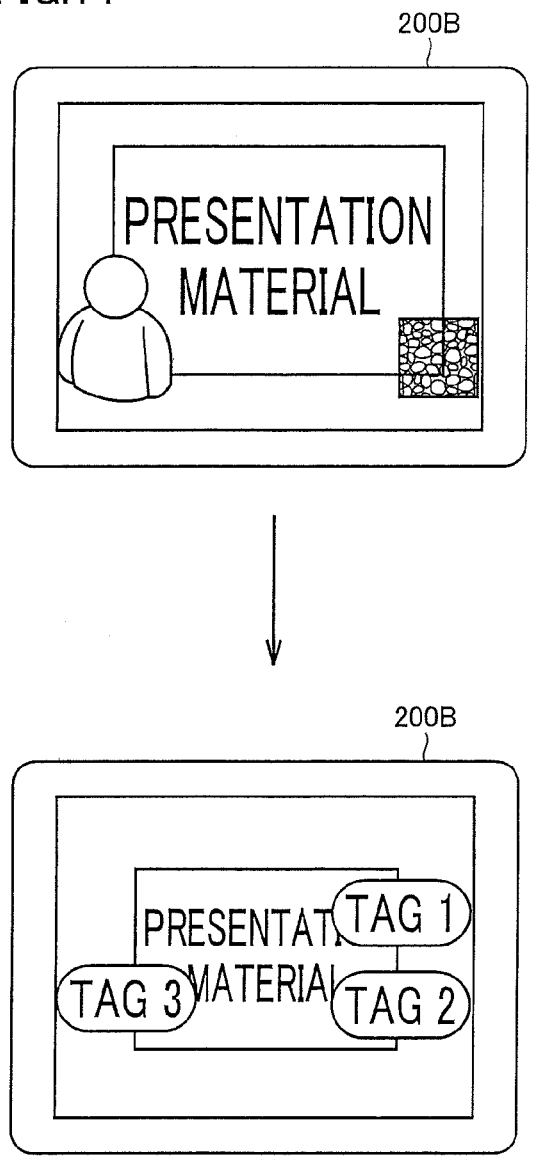
FIG. 14 and FIG. 15 are diagrams for explaining a process in the first modification.
Figure 15:
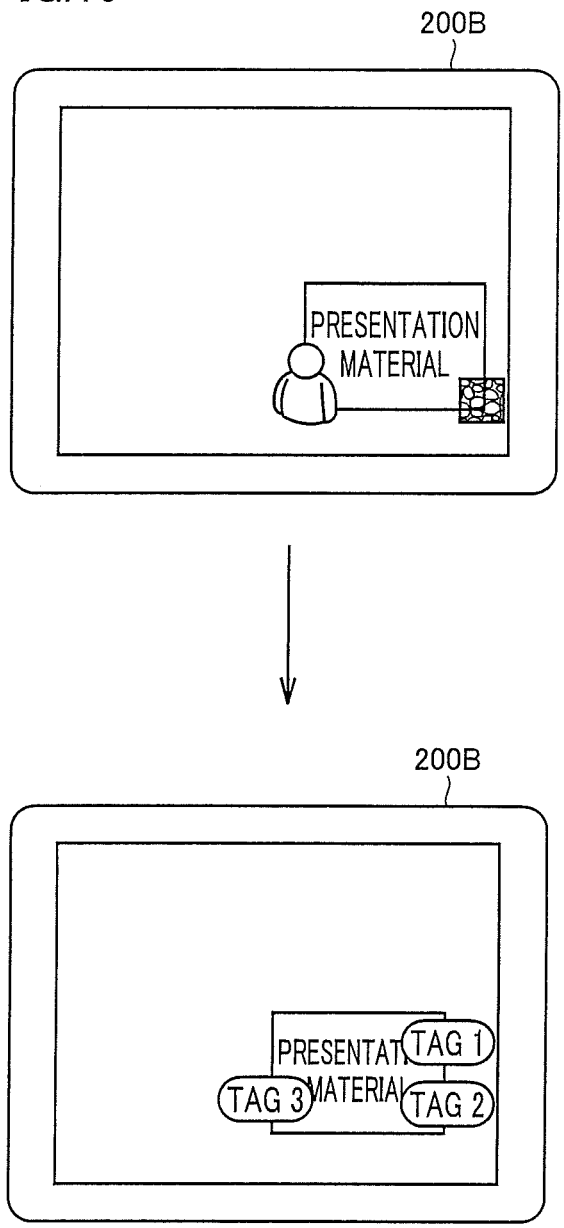

FIG. 14 and FIG. 15 are diagrams for explaining a process according to a first modification. In the first modification, the size of the tagged screen is varied according to the size of a shot image by portable terminal 200B. Specifically, in a case where a shot image is large as shown in FIG. 14, the size of the tagged screen is enlarged. In a case where the shot image is small as shown in FIG. 15, the size of the tagged screen is reduced. The size of the shot image can be detected by CPU 20 of portable terminal 200, for example, by storing a reference size of a QR code in portable terminal 200 in advance and by comparing the size of the QR code in the shot image with the reference size.

Figure 16:
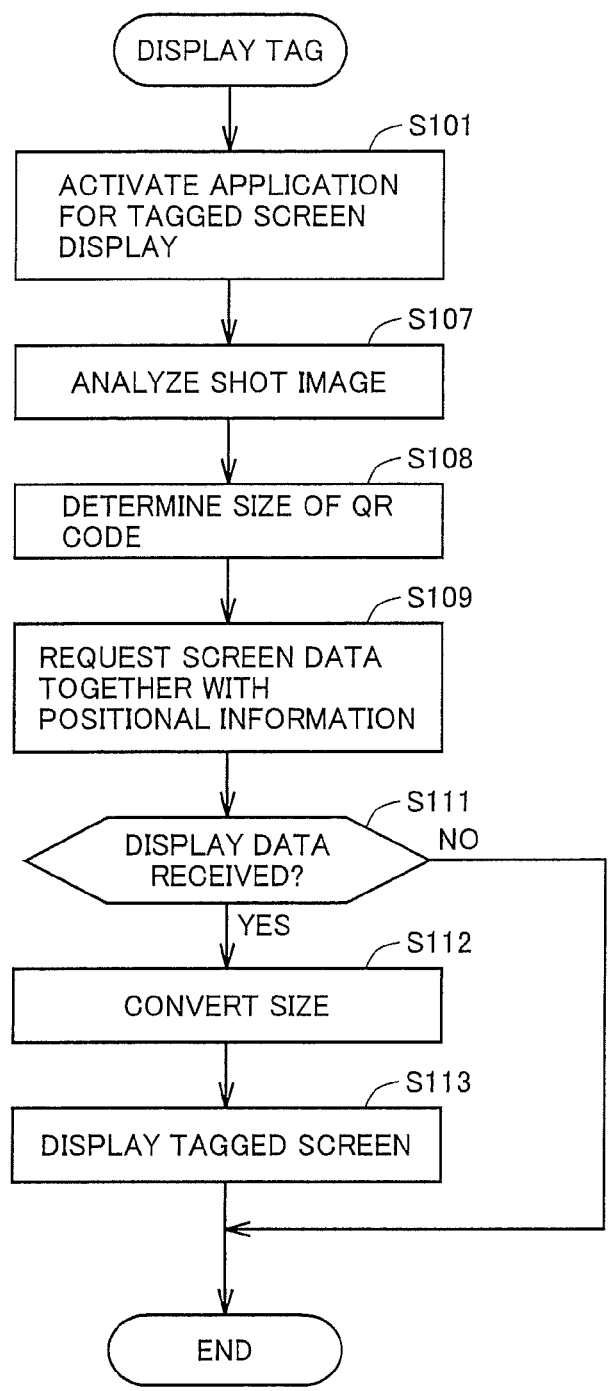
FIG. 16 is a flowchart showing a specific example of an operation in the portable terminal according to the first modification.

FIG. 16 is a flowchart showing a specific example of an operation in portable terminal 200 according to the first modification. The flowchart in FIG. 16 illustrates an operation in the case where an image is shot (YES in step S103), among the operations in portable terminal 200 illustrated in FIG. 11. The flowchart in FIG. 16 includes steps S108 and S112 in addition to the operations in FIG. 11. Specifically, referring to FIG. 16, in the first modification, portable terminal 200 analyzes the shot image to extract a QR code, and then determines the size of the extracted QR code by comparing the QR code with the reference size stored in advance. Alternatively, the size of the QR code may be determined based on the ratio of the QR code to the screen size.

Then, the screen data is received from server 800 in step S111, and the screen is then converted according to the determined size of the QR code.

More specifically, in the case where the shot image is large as shown in FIG. 14, the ratio of the QR code is large. Therefore, the size of the tagged screen to be displayed is increased by receiving and then applying the ratio to the screen data. Conversely, in the case where the shot image is small as shown in FIG. 15, the ratio of the QR code is also small. Therefore, the size of the tagged screen to be displayed is also reduced by receiving and then applying the ratio to the screen data.

The display position on operation panel 25 of portable terminal 200B may be specified in the same way. Specifically, when a position where a QR code is combined in the shot image by camera 400 is predefined, the position of the QR code in the display of the shot image by portable terminal 200B on operation panel 25 may be specified, and the display position of the tagged screen may be determined in accordance with the specified position. For example, in the example in FIG. 15, the QR code is located closer to the bottom right on the screen in the shot image by portable terminal 200B. Therefore, the display position of the tagged screen is also determined to be located closer to the bottom right in the same way.

By doing this, the tagged screen is displayed in the size equivalent to the size in the case where the audience who carries portable terminal 200B shoots an image of the presentation material projected by projector 300B using portable terminal 200B. Therefore, a screen easy to see for the audience who carries portable terminal 200B can be provided.

<Second Modification>

In the example above, portable terminal 200B obtains the positional information of camera 400 from the image projected by projector 300B, by combining an image (QR code) representing the positional information with a shot image by camera 400, shooting the combined image with portable terminal 200B, and then analyzing the shot image to obtain the positional information from the QR code.

However, the method of obtaining the positional information of camera 400 is not limited to this method.

Figure 17:
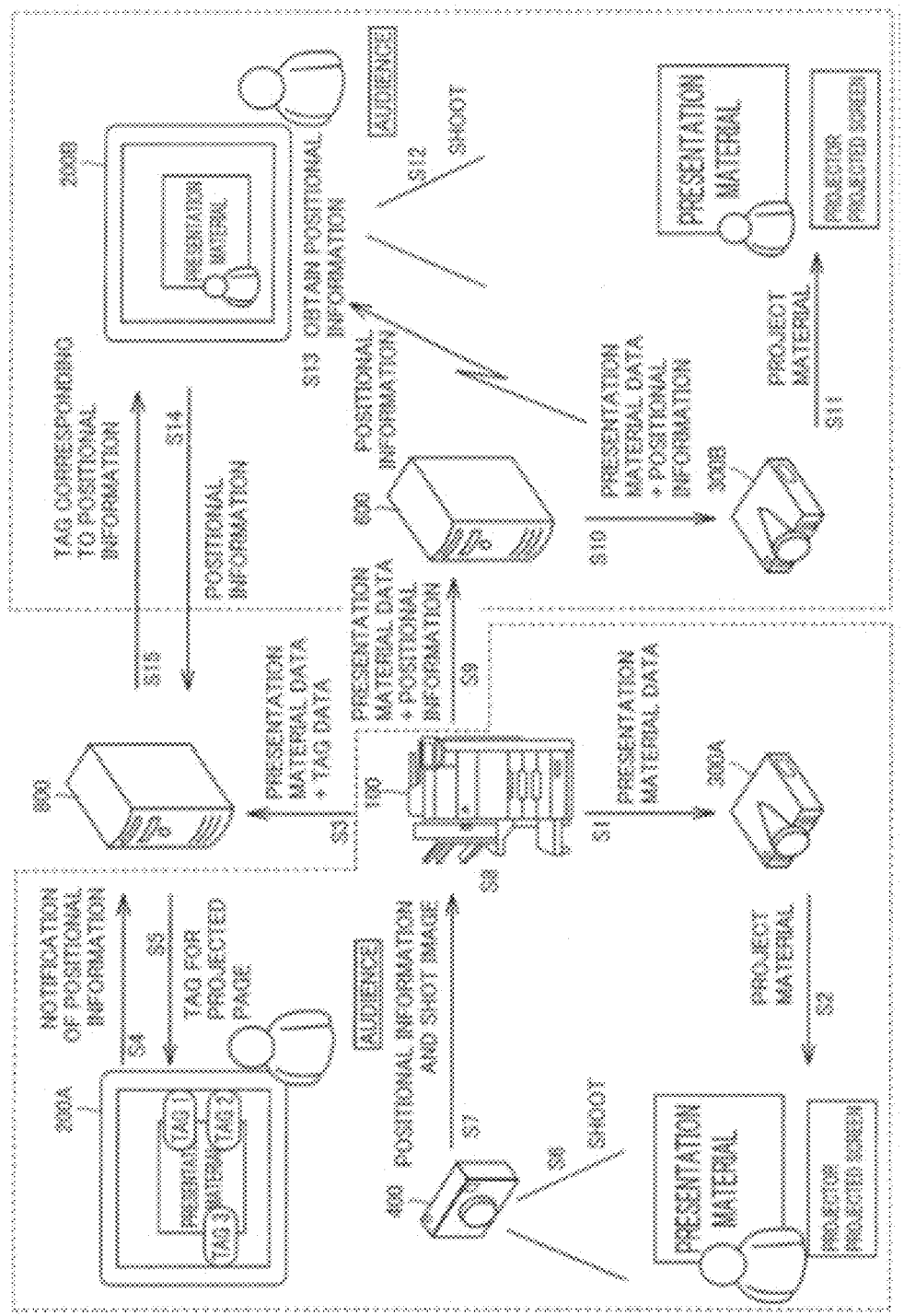
FIG. 17 is a diagram illustrating an operation overview in the system according to a second modification.

FIG. 17 is a diagram illustrating an operation overview in system 1 according to a second modification. Referring to FIG. 17, in the second modification, for example, the content reproduction device in the second site as represented as projector 300B in the example above transmits the positional information of camera 400 to portable terminal 200B via wireless communication. The wireless communication may be, for example, infrared communication, or communication using radio waves such as Bluetooth® or Wifi® or using electromagnetic waves such as visible light communication.

In the case where projector 300B has such a communication function, the positional information of camera 400 may be transmitted from projector 300B to portable terminal 200B, or projector 300B may be replaced by a content reproduction device having a wireless communication function, such as a PC (Personal Computer).

In this case, MFP 100 converts the positional information into information for wireless communication (for example, visible light communication modulated information, or the like) in place of a process of converting the positional information of camera 400 into an image. The conversion method here is not limited to any particular method. Then, the positional information is transmitted together with the shot image to server 600.

In a case where it is predefined whether the positional information of camera 400 is converted into an image or into information for wireless communication, MFP 100 may convert the positional information in accordance with the definition, or may receive a notification as to whether the content reproduction device has a wireless communication function, from server 600 that establishes communication with the content reproduction device, and then convert the positional information in accordance with the notification.

By doing this, the positional information of camera 400 can be obtained at portable terminal 200B without performing a special authentication or procedure, thereby facilitating display of a tagged screen at portable terminal 200B.

<Third Modification>

In the example above, server 800 receives a presentation material and tag data from MFP 100 and combines them for transmission to portable terminal 200.

However, MFP 100 may transmit to server 800 tag data and information that specifies the position to display the tag data. In this case, portable terminal 200A requests tag data by activating an application for displaying a tagged screen, shooting an image, and then transmitting the positional information that specifies the position and orientation at the time of shooting to server 800. Portable terminal 200B requests tag data by activating an application for displaying a tagged screen, shooting an image, and then transmitting the positional information specified from the QR code extracted from the shot image to server 800.

When obtaining the positional information from portable terminal 200, server 800 specifies a tag to be displayed for the content (presentation material) included in the image shot with the position and orientation specified by the positional information, and transmits the tag data to portable terminal 200. Then, portable terminal 200 combines the received tag data with the shot image and displays a tagged screen in which the tag is superimposed on the shot image.

Also in this case, portable terminal 200 may convert the size of the tag in accordance with the size of the QR code in the shot image as described in the first modification above.

By doing this, a tagged screen can be displayed at portable terminal 200A with a simple operation, similarly. A tagged screen can also be displayed with a simple operation at portable terminal 200B at a remote site, in a similar manner as the operation on portable terminal 200A based on the position of camera 400. In other words, the tagged screen can be displayed as if portable terminal 200B resided in the first site.

A program for allowing each device in system 1 to execute the operation above may be provided. Such a program may be stored in a computer-readable recording medium accompanying a computer, such as a flexible disk, a CD-ROM (Compact Disk-Read Only Memory), a ROM, a RAM, and a memory card, and be provided as a program product. Alternatively, the program may be stored in a recording medium such as a hard disk contained in a computer. The program may be downloaded via a network.

The program in accordance with the present invention may allow the process to be executed by invoking necessary modules, among program modules provided as a part of Operating System (OS) of a computer, in a prescribed sequence at a prescribed timing. In this case, the modules are not included in the program itself, and the process is executed in cooperation with the OS. The program that does not include such modules may also be included in the program in accordance with the present invention.

Furthermore, the program in accordance with the present invention may be embedded in a part of another program. In this case, the modules included in another program are not included in the program itself, and the process is executed in cooperation with another program. Such a program embedded in another program may also be included in the program in accordance with the present invention.

The provided program product is installed in a program storage unit such as a hard disk for execution. It is noted that the program product includes the program itself and a recording medium encoded with the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A content display support system comprising:
a portable terminal having a display capable of displaying content and supplementary information;
a content display support device that supports content display at said portable terminal; and
a shooting device,
wherein said shooting device includes a transmission unit that transmits a shot image obtained by shooting content reproduced by a first reproduction device and positional information that specifies a position and orientation of said shooting device, to said content display support device,
wherein said content display support device includes:
an obtaining unit that obtains said shot image and said positional information from said shooting device,
a generation unit that generates combination content by visualizing and embedding said positional information in said shot image, a control unit that transmits said combination content to a second reproduction device for reproduction, and a transmission unit that transmits said supplementary information associated with said positional information to said portable terminal in response to a request from said portable terminal, and wherein said portable terminal includes:

a processing unit that obtains said positional information from an image obtained by shooting said combination content reproduced by said second reproduction device, a request unit that requests said supplementary information to be displayed on said display from said content display support device by transmitting said positional information obtained by said processing unit to said content display support device, and a display processing unit that displays said supplementary information received from said content display support device on said display.

2. The content display support system according to claim 1, wherein said generation unit of said content display support device converts said positional information into code information and embeds the code information in said shot image.

3. The content display support system according to claim 1, wherein said transmission unit of said content display support device transmits said supplementary information to said portable terminal if said positional information transmitted from said portable terminal falls within a predefined target range of transmission of said supplementary information.

4. The content display support system according to claim 1, wherein said portable terminal converts a display size of said supplementary information according to a size of an image representing said visualized positional information in an image obtained by shooting said combination content reproduced by said second reproduction device.

5. The content display support system according to claim 1, wherein said display processing unit of said portable terminal combines an image based on said supplementary information with an image obtained by shooting said combination content reproduced by said second reproduction device, and displays said combined image on said display.

6. A content display support system comprising:

a portable terminal having a display capable of displaying content and supplementary information;

a first reproduction device and a second reproduction device for displaying said content;

a content display support device for supporting content display at said portable terminal; and a shooting device, wherein said shooting device includes a transmission unit that transmits a shot image obtained by shooting content reproduced by said first reproduction device and positional information that specifies a position and orientation of said shooting device, to said content display support device, wherein said content display support device includes:

an obtaining unit that obtains said shot image and said positional information from said shooting device, a control unit that transmits said positional information and transmits the content reproduced by said first reproduction device to said second reproduction device for reproduction, and a transmission unit that transmits said supplementary information associated with said positional information to said portable terminal in response to a request from said portable terminal, wherein said second reproduction device includes:

a reception unit that receives said positional information from said content display support device, and a transmission unit that transmits said positional information received by said reception unit to said portable terminal, and wherein said portable terminal includes:

an obtaining unit that obtains said positional information transmitted from said second reproduction device, a request unit that requests said supplementary information to be displayed on said display from said content display support device by transmitting said positional information obtained by said obtaining unit to said content display support device, and a display processing unit that displays said supplementary information received from said content display support device on said display.

7. A content display support device for supporting content display at a portable terminal, comprising:

an obtaining unit that obtains, from a shooting device, a shot image obtained by shooting content reproduced by a first reproduction device and positional information that specifies a position and orientation of said shooting device;

a generation unit that generates combination content by visualizing and embedding said positional information in said shot image;

a control unit that transmits said combination content to a second reproduction device for reproduction; and a transmission unit that accepts, from said portable terminal, a request for supplementary information together with said positional information obtained from an image obtained by shooting said combination content reproduced by said second reproduction device, thereby transmitting said supplementary information associated with said positional information to said portable terminal.

8. A method of supporting display of content at a portable terminal, comprising the steps of:

shooting, by a shooting device, content reproduced by a first reproduction device;

obtaining, by a content display support device, a shot image by said shooting device and positional information that specifies a position and orientation of said shooting device;

generating, by said content display support device, combination content by visualizing and embedding said positional information in said shot image, and transmitting the generated combination content to a second reproduction device;

reproducing, by said second reproduction device, said combination content;

obtaining, by said portable terminal, said positional information from an image obtained by shooting said combination content reproduced by said second reproduction device;

requesting, by said portable terminal, supplementary information to be displayed from said content display support device by transmitting said positional information to said content display support device;

transmitting said supplementary information associated with said positional information from said content display support device to said portable terminal in response to a request from said portable terminal; and displaying said supplementary information received from said content display support device, at said portable terminal.

9. A non-transitory computer-readable storage medium encoded with a program for causing a content display support device having a controller to execute a process of supporting display of content at a portable terminal,
   wherein said program instructs said controller to perform the steps of:
   obtaining, from a shooting device, a shot image obtained by shooting content reproduced by a first reproduction device and positional information that specifies a position and orientation of said shooting device;
   generating combination content by visualizing and embedding said positional information in said shot image;
   transmitting said combination content to a second reproduction device for reproduction; and
   accepting, from said portable terminal, a request for supplementary information together with said positional information obtained from an image obtained by shooting said combination content reproduced by said second reproduction device, thereby transmitting said supplementary information associated with said positional information to said portable terminal.

10. A non-transitory computer-readable storage medium encoded with a program for causing a portable terminal having a display and a controller to execute a content display process,
   wherein said program instructs said controller to perform the steps of:
   obtaining positional information from a shot image obtained by shooting combination content having said positional information embedded therein that is reproduced by a reproduction device;
   requesting supplementary information from a content display support device by transmitting said positional information to said content display support device; and
   displaying, on said display, said supplementary information transmitted from said content display support device in response to said request.

* * * * *